Oct. 3, 1939.  C. C. ERICKSON  2,174,782
LOG ROSSING MACHINE
Filed Aug. 4, 1937  3 Sheets-Sheet 1

Inventor:
Clinton C. Erickson
by
Attorney

Oct. 3, 1939.  C. C. ERICKSON  2,174,782
LOG ROSSING MACHINE
Filed Aug. 4, 1937  3 Sheets-Sheet 2
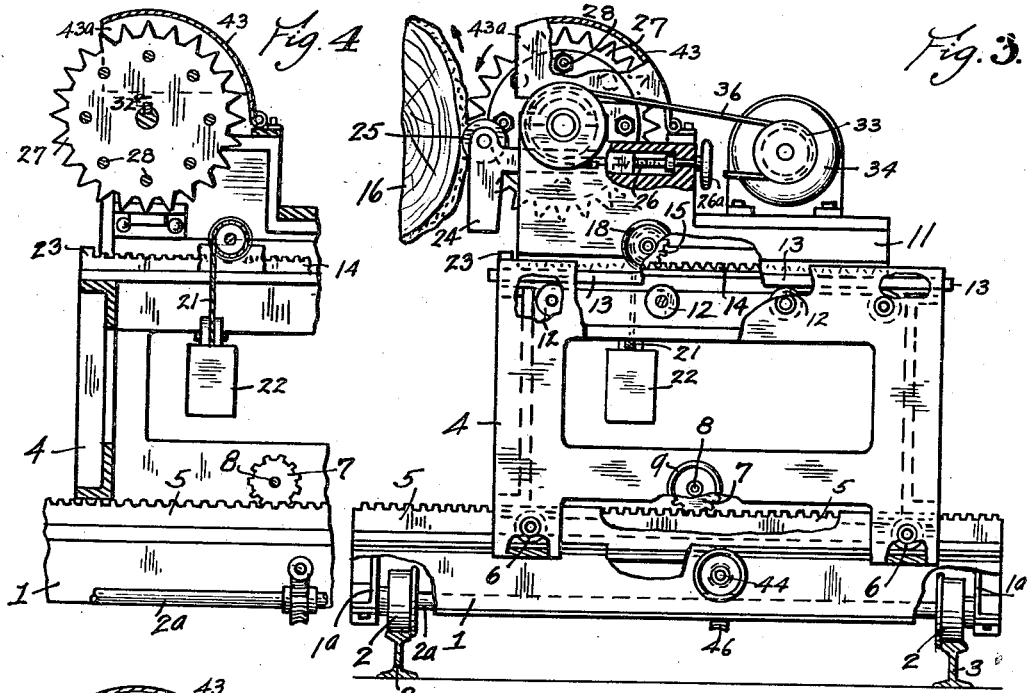
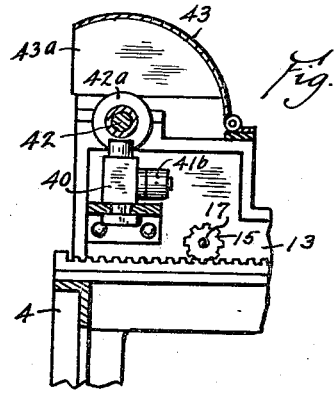
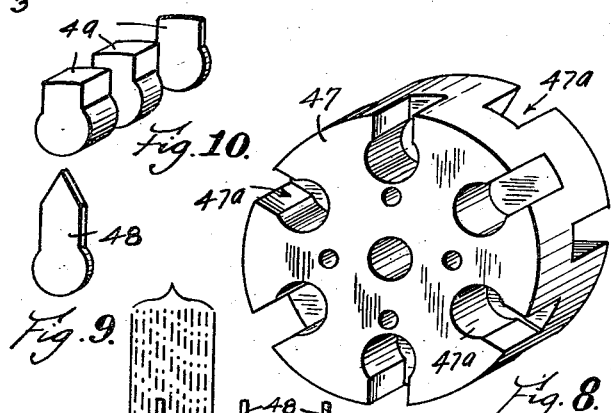
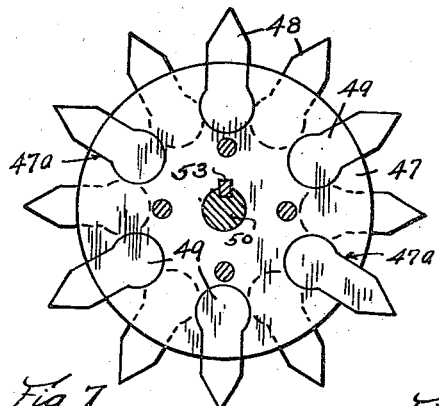
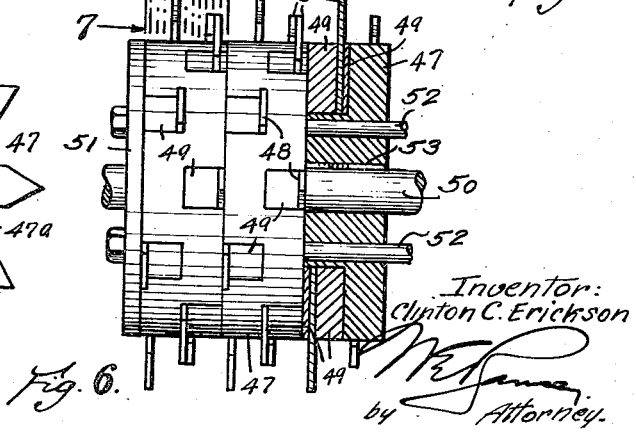
Inventor:
Clinton C. Erickson
by [signature] Attorney.

Oct. 3, 1939.  C. C. ERICKSON  2,174,782
LOG ROSSING MACHINE
Filed Aug. 4, 1937  3 Sheets-Sheet 3
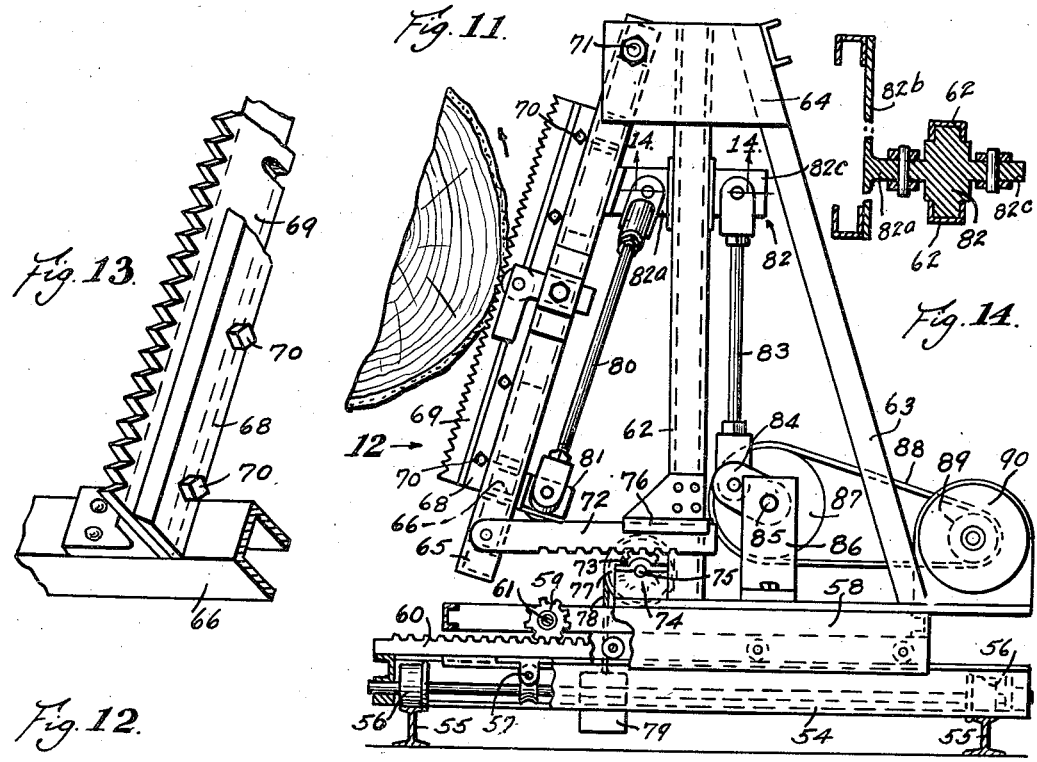
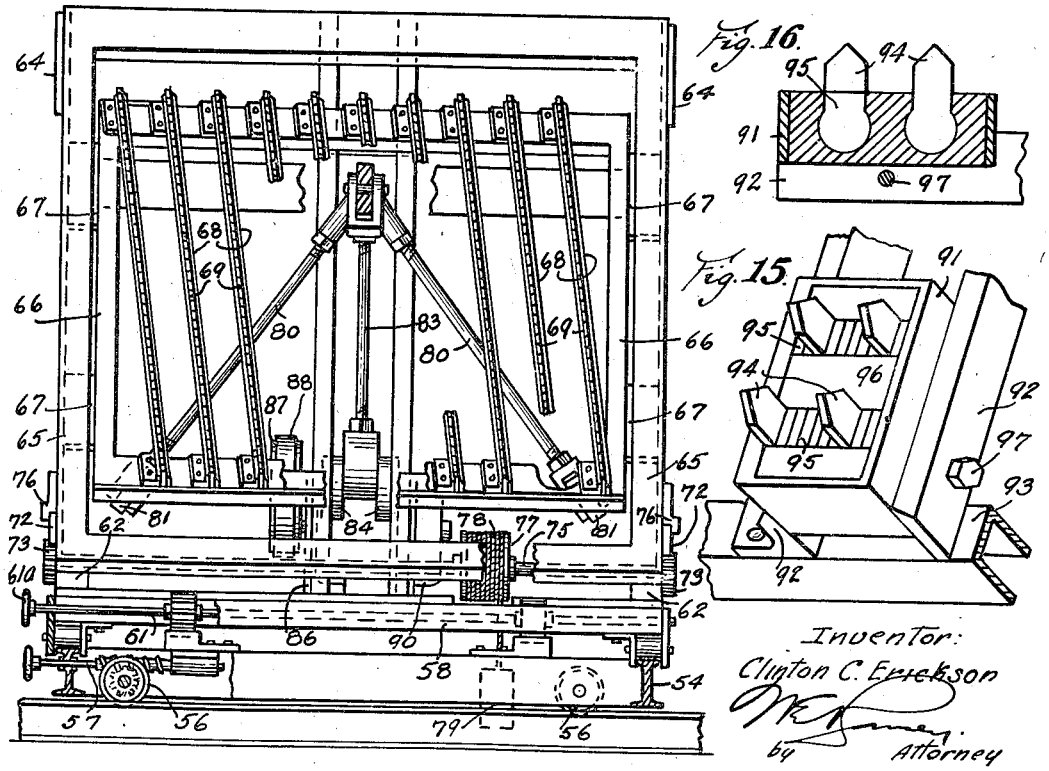
Inventor:
Clinton C. Erickson
by _____ Attorney Patented Oct. 3, 1939

2,174,782

UNITED STATES PATENT OFFICE 2,174,782

LOG ROSSING MACHINE

Clinton C. Erickson, Portland, Oreg.

Application August 4, 1937, Serial No. 157,373

1 Claim. (Cl. 144—208)

My invention relates to a machine for removing bark, knots and other irregularities from the peripheral surface of a log. A machine of this character is commonly referred to as a log rossing machine. Said machines function to prepare the rough external periphery of the log so as to remove all of the external undesirable portions thereof. It has its greatest application in the preparation of logs for a veneer lathe, in paper making, and in other arts where a smooth-surface, clean log is to be desired.

One of the principal objects of my invention is to provide a machine which will not only remove the bark and other portions which can be pried or ripped off with more or less facility, but also to cut away uneven portions, blemishes, knots and other projecting portions which are usually undesirable for one reason or another.

This principal object of my invention is attained by providing an operating head, either rotary or reciprocal, which carries a plurality of closely spaced saw blades or cutter elements. Said saw blades or cutter elements preferably are given a relatively high operating speed and are adapted to move along cutting paths so as to make one continuous swath the entire length of the machine although the saws or cutting elements themselves are rather thin and normally cut a narrow kerf. This can be produced by giving said cutting elements lateral oscillation or inclining them obliquely to traverse an oblique path or to arrange said cutting elements in staggered relation so that their cutting paths coincide, more or less, at their margins to supplement each other and produce said continuous cutting swath.

A further object of my invention is to provide a machine of this character with a guiding device which is adapted to ride upon a finished portion of the log and to define a pattern for moving the cutting blade over the successive portions of the log to produce a uniformly smooth finished contour upon said log.

A further object of the invention is to provide a machine of this character which is provided with feeding means for varying the depth of the cut produced by said elements within relatively narrow limits, with resilient yielding means provided to permit said blades to swing outwardly and away from a log if an obstruction is encountered which might injure said cutting elements.

A further object of my invention is to provide a machine of this character in which a plurality of cutting elements are arranged in a bank and operate in substantially parallel paths, and said bank of saws is given lateral movement so as to widen the effective width of said paths so that each saw will cut a swath substantially equal in width to the thickness of the cutter element plus the space between adjacent elements, thus to produce a swath of uniform depth the entire length of said bank of saws.

A further object of my invention is to provide a machine of this character with cutter elements arranged in a bank as aforesaid and with each of the cutter elements operatively arranged so that it can be individually removed for sharpening, repair or replacement.

Further and more specific objects and operating advantages of my machine are hereinafter described with reference to the accompanying drawings in which:

Fig. 3 is an end elevation of said machine taken in the direction of arrow 3 in Fig. 1, portions being shown broken away to disclose operating details thereunder;

Fig. 4 is a fragmentary vertical section taken on the line 4—4 in Fig. 2 showing a cutting element and the details of the yielding mechanism for permitting the bank of saws to swing outwardly in the presence of an obstruction to avoid damage to said cutting element;

Fig. 5 is a vertical fragmentary section taken substantially on the line 5—5 in Fig. 2;

Fig. 6 is an elevation, with portions shown in section, of a cutting head provided with the insertable teeth arranged in staggered relation and spaced apart a distance comparable to their width so that a cutting swath made by said head will be of such width as will approximate the length of said head;

Fig. 7 is a section looking in the direction of the arrow 7 in Fig. 6;

Fig. 8 is a perspective view of one section of said head with the insertable teeth shown removed therefrom;

Fig. 9 is a perspective view of one of said removable teeth;

Fig. 10 is a perspective view of the spacer elements for holding one of said teeth in said head, and several spacer elements are shown to show how the width can be varied to accommodate the staggering of the various teeth in said head;

Fig. 11 is an end elevation of a modification of my invention in which reciprocal saws are provided for rossing the bark from a log;

Fig. 12 is a side view of the modifications shown in Fig. 11 taken substantially in the direction of the arrow 12 in Fig. 11, some of the saw blades being shown broken, as well as some of the framework, to disclose operating details of said modification;

Fig. 13 is a fragmentary perspective view of a saw blade of said modification showing the manner in which it is removably inserted in its carrier;

Fig. 14 is a fragmentary section taken on the line 14—14 in Fig. 11, illustrating the manner in which a cross-head embodied in this modification is guided in the framework thereof;

Fig. 15 is a fragmentary perspective view illustrating how insertable teeth can be provided in a reciprocating machine of this character and staggered in the manner in which the insertable toothed head is arranged in the modification shown in Figs. 6 to 10, inclusive; and Fig. 16 is a fragmentary sectional view thru the cutting assembly showing the manner in which the teeth are held in place.

Figure 1:
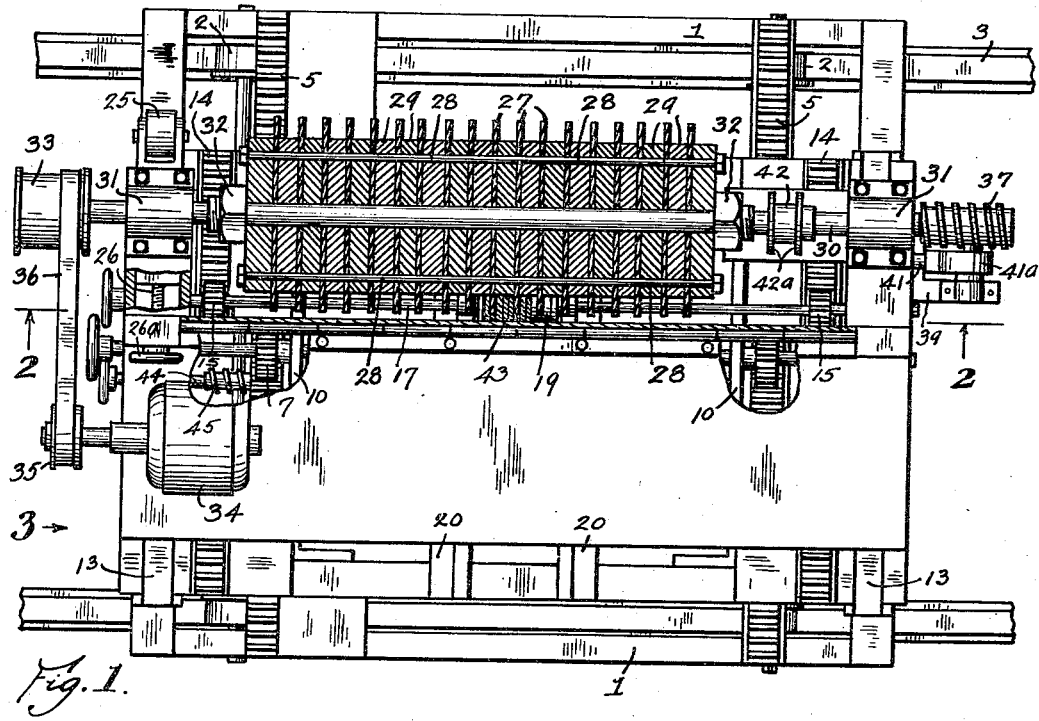
Fig. 1 is a plan view of my machine, with portions thereof shown broken away, however, to disclose operating details of said machine.

A machine embodying my invention comprises a carriage 1 supported on flanged wheels 2 adapted to run upon and engage a pair of spaced rails 3. Said carriage carries a main frame member 4 upon its upper surface and the relative movement between said carriage and frame is controlled by a pair of rack members 5 carried by the face of said carriage and pinions 7 carried by the frame. Said members extend normal to the rails 3. The frame is supported by a plurality of rollers 6 bearing upon the bounding member 1a of the carriage. Movement of said rollers along said bounding members is resisted by the engagement of pinions 7 with the rack members 5.

Figure 2:
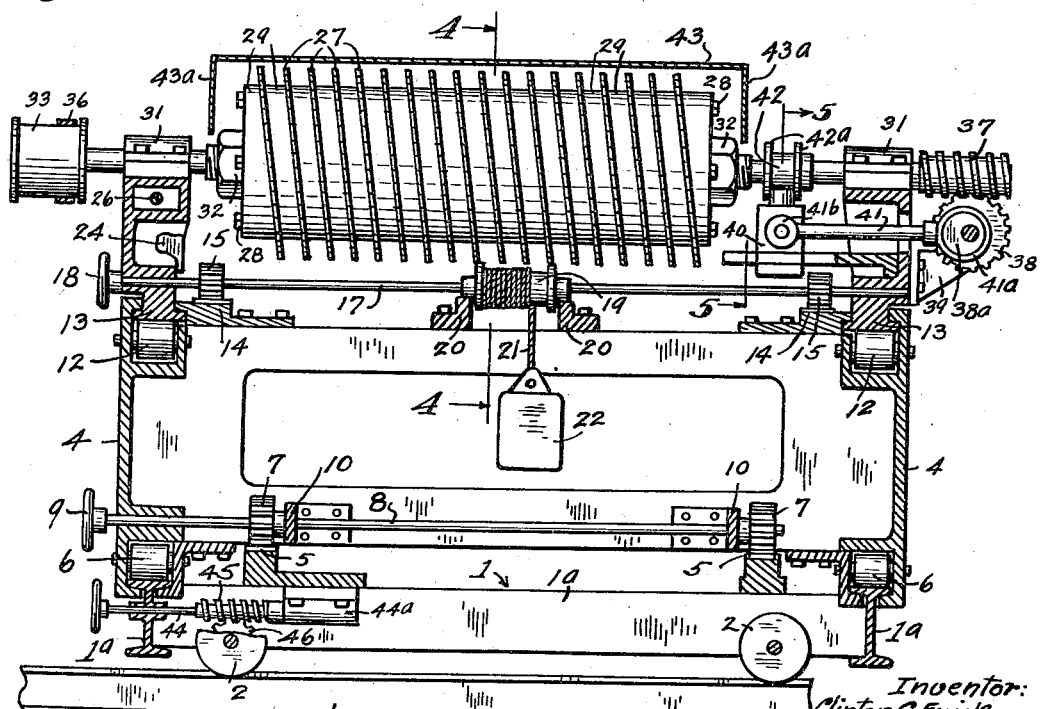
Fig. 2 is a vertical section taken thru said machine substantially on the line 2—2 in Fig. 1.

There preferably are two pinions each engaging a rack member, and said pinions are carried by a shaft 8 having a rotatable wheel 9 at one end thereof. Said rotatable wheel lies exteriorly of said main frame and can be grasped to rotate said shaft and the pinions carried thereby to move the main frame lengthwise along said bounding members as said pinions climb over said rack. Said shaft 8 is suitably journaled in bearings 10 carried by said main frame 4 as well as being journaled in the frame itself, as is illustrated in Fig. 2.

Upon the upper face of said main frame is an auxiliary or head frame 11. This is likewise supported by rollers 12 journaled in the main frame and bearing against rail members 13 on said head frame, as illustrated in Fig. 2. A pair of rack members 14 are carried by the upper face of the main frame 4 and a pair of pinions 15 engage said rack members. Said rack members are arranged substantially parallel with the rack members 5, and both are normal to the rails and are directed toward a log 16 to be rossed. It is to be understood that a log to be operated upon is chucked in a lathe or otherwise mounted for rotation and preferably said log is rotated in the opposite direction of rotation from the cutter elements hereinafter described. This relative direction of rotation of said elements is diagrammatically illustrated by arrows in Fig. 3. The pinions 15 are carried by a shaft 17 which is provided with a rotatable setting wheel 18 also arranged exteriorly of the head frame so that it can be conveniently operated as is illustrated in Fig. 2.

Upon said shaft, also, is arranged a drum 19. Brackets 20 are arranged at each side of the drum to give bearing support to the shaft 17. A cable 21 is spooled about said drum and at the end of said cable is a counter-weight 22. Said cable is wound about said drum and the counter-weight is of such mass as will tend to impose a substantial force holding the auxiliary or head frame toward the log being operated upon. A stop 23 is arranged upwardly upon the main frame and limits the movement of the auxiliary or head frame toward said log. The function of said counter-weight structure is to provide a yielding member which permits said auxiliary head to move backwardly away from the log when an obstruction is encountered which would tend to break or otherwise injure the operating parts of my machine. The counter-weight would tend to move upwardly under an impact with such an obstruction. It would then tend under the force of gravity to move the said auxiliary head back into its set position. As illustrated in Fig. 3, the parts are preferably arranged so that the auxiliary head is spaced slightly from said stop so as to permit said head to move inwardly under the influence of said counter-weight.

Upon said head is a guide 24 with a roller 25 arranged at its outer edge. Said roller is adapted to follow the curvature of the log being operated upon. Said roller is adapted to bear upon the portion of the said log previously operated upon by my machine and thus defines the cutting depth thereof. It is to be assumed, however, that when the first cut is taken upon a length of log, the cutting operation is performed under the control and judgment of an operator and the cutting operation is of such depth as is indicated by his eye. Thereafter, however, the roller 25 bears upon the cut portion of said log to guide the cutter elements therefor. Said guide is adjustable toward and from said log by an adjusting screw 26 which is fitted into the auxiliary head 11 and is manipulated by a wheel 26a as is shown in Fig. 3. Of course, the extent to which said guide and its roller are moved determines the depth of the cut made by the cutter elements hereinafter described.

The cutter elements preferably are notched saw blades or discs 27. They are arranged in a bank and are secured together by elongated tie bolts 28 and are spaced apart by spacer elements 29. Said bolts extend thru the spacer elements as well as thru the saws and tie said parts securely together. Said blades and spacer elements are mounted upon a mandrel 30 journaled in bearings 31 upon said head frame 11. Tightening nuts 32 are fitted upon said mandrel 30 and bear tightly against the faces of the outermost spacer elements to aid the tie bolts in holding said parts tightly together and to bind them to the mandrel in connection with key 32a.

Said saw blades preferably are arranged at oblique angles to the axis of rotation of the mandrel and thus constitute so-called "wabble" saws which do not operate in the plane of said saws. That is, said saws produce a cutting swath substantially wider than the width of their cutting edges. The degree to which said saws are tipped preferably is one which spans substantially the distance between the adjacent saws. Thus the over-all swath cut by the bank of blades thus arranged is substantially equal to the length of said bank. The mandrel is driven by a pulley 33 secured to one end thereof and said pulley is driven by an electric motor 34 mounted upon the upper face of the auxiliary head frame 11 and bolted thereto. Said electric motor is provided with a driving pulley 35 and the driving pulley and the mandrel pulley are connected by an endless belt 36.

Because of the fact that the "wabble" saws do not cut individual kerfs of uniform depth, it is desirable that the mandrel and the saws carried thereby be given in oscillating motion, that is, a motion lengthwise of said mandrel. This is accomplished by moving said mandrel with the cutting elements carried thereby crosswise of said head frame. To this end a worm 37 is carried by said mandrel, and a worm gear 38 is journaled in bracket 39 upon the head frame 11. Said worm gear has an eccentric cam 38a formed thereon. Said cam is connected to a slidable shifter element 40 by a connecting rod 41. The connecting rod has an encircling follower 41a formed at one end which encircles and thus engages the eccentric cam 38a. The other end of said connecting rod is formed into an eye 41b which engages the slideable shifter element 40. A pair of spaced collars 42a are formed as integral portions of sleeve 42 secured to the mandrel 30. Thus, the rotation of said mandrel and therewith the worm 37 causes the mandrel to be shifted laterally thru the action of the worm gear, its eccentric cam, the connecting rod and the slideable shifter element which engages the opposed faces of the collars 42a of the sleeve 42. Because of the fact that the member being shifted is also rotating, it is obvious that the movement of said mandrel laterally will not be uniform in exact relation to its rotation. This is not of consequence, however, because the worm and worm gear are geared so that the mandrel is shifted laterally only about once every six rotations thereof.

For safety a guard 43 is arranged to overlie the saw blades and said guard may be hinged so that it can be swung back to give access to said saw blades. Said guard also is provided with end portions 43a which lie at the end of said saws so as to shield said saws from the ends thereof.

The entire machine supported by the main frame and the carriage can be shifted laterally along the track members 3 by a feed screw 44 carrying a worm 45 thereon which is in engagement with a worm gear 46 secured to the axles 2a of the flanged wheels which engage said track members. Said feed screw is journaled in the frame of said carriage and in a bearing 44a secured to the under side thereof.

It is apparent that the saw blades 27 and the spacers can be removed by slacking off the tightening nuts 32 and the tie bolts 28, and slipping the saws off the mandrel after the latter has been released from its bearings. Thus, when the saw blades are to be replaced, they can be replaced separately. It is to be understood that the saws are to be sharpened normally in place on the machine. The guard 43 is lifted back and convenient access may be had to said saws for the purpose of sharpening.

In Figs. 6 to 10 I show cutter heads in which the separate teeth 48 or cutters can be separately removed. It is to be understood that only a few of said teeth are shown in Fig. 6 and when they are arranged in a bank they can be arranged upon a mandrel in the manner in which the saw blades 27 are mounted in Figs. 1 to 5, inclusive.

The teeth are arranged in head 47 having a plurality of recesses 47a opening out to the peripheral surface of said head. Said recesses are formed with a circular inward end to receive and hold the curved bases of cutter teeth 48 illustrated in Fig. 9. Said cutter teeth are spaced radially about the head, as is illustrated in Fig. 7, but they are also spaced laterally of the head a distance equal substantially to the width of a tooth. This is diagrammatically illustrated in the left-hand cutter head in Fig. 6. The approximate width of said teeth is shown by dotted lines and the aggregate width of said teeth are shown by the length of the bracket extending across said dotted lines.

To accommodate this large number of teeth in each head, it is desirable that the recesses open toward both of the faces and a plurality of spacers 49 illustrated in Fig. 10 are provided for locating and holding the cutter teeth in the recesses. A selected spacer is arranged in said recess and a tooth is placed upon it. If said tooth does not rest against the edge of said recess, the remaining space is filled by another spacer. Said spacers can be arranged in unit thicknesses because they correspond to one or more units equal to the gauge or kerf width of the saw teeth inserted. Said cutter heads are arranged in abutment with each other and upon a mandrel 50. The outermost head is covered by a plate 51 secured thereto by the heads of tie bolts 52. Each of the heads is secured to the mandrel by a key 53 and said teeth cannot move outwardly because their enlarged circular bases 48a are arranged in correspondingly curved and formed recesses 47a in the cutter head.

If a tooth is to be removed, the tie bolts are slackened off and the cutter head carrying the tooth to be removed is spaced from the adjacent head so that said tooth and spans therefor can be slid laterally out of the recess and a new tooth substituted therefor. This structure permits separate teeth to be removed. Of course, it is possible to remove an entire head in the same manner that a saw is removed. Because of the fact that said heads carry teeth staggered about the face so as to occupy the entire lateral width thereof, it is not necessary that said cutter head elements be given lateral movement as are the "wabble" saws in the modification shown in Figs. 1 to 6, inclusive. It is not necessary that there only be one tooth arranged in each plane about the periphery of the head, but if it is desired several teeth can be arranged in alinement. Each tooth or each series of teeth thus alined cuts a kerf equal to the width of the cutting portion thereof. Inasmuch as the teeth are arranged to cut parallel kerfs and the operating planes of said teeth are arranged adjacent each other, an operating swath of each head is produced which is continuous across its entire length, although each cutting tooth cuts only a relatively small portion thereof.

In Figs. 11 to 15, inclusive, I illustrate how reciprocating saws can be used in another modification of my invention instead of rotary saws as in the two previous embodiments thereof. In said figures the main structures operate similarly to the modification shown in Figs. 1 to 5, inclusive, and thus has not been shown in great detail.

A carriage 54 is adapted to ride rails 55 and flanged wheels upon said carriage engage said rails. A feed screw 57 with worm and worm gear structures appended thereto are adapted to drive the flanged wheels 56 and rotate them so that the feed carriage is adjustable lengthwise of said rails. The main frame 58 is slidably carried upon said carriage and is adjustable thereon by pinions 59 which engage racks 60 carried by the carriage. The pinions are rotatable by a shaft 61 having an operating handle 61a at one end thereof.

Said main frame carries a series of vertical uprights 62 and inclined supporting uprights 63 secured thereto by plates 64. Secured to said plates is a swing frame 65 made up of bounding members and in said swing frame is an auxiliary saw frame slidably secured therein. Said saw frame is carried by four slides 67. The swing frame is flanged to hold said slides and the auxiliary saw frame 66 is thus held to an operating path coinciding with the general plane of said auxiliary saw frame. A plurality of saw holders 68 are arranged across said auxiliary saw frame in oblique fashion, as is shown in Fig. 12, and removable saw blades 69 are secured therein. Said saw blades preferably are provided with notched backs as is illustrated in Fig. 13 and are held in the holders by bolts 70. Said bolts can be slackened off and said blades removed because of said notched construction. The upper end of the swing frame 65 is pivoted as at 71. The lower end is free and is held so that it will be inclined outwardly as is shown in Fig. 11 by a notched rack member 72, pivotally secured at one end to said swing frame. Said rack member engages a pinion 73 journaled in said main frame bearings 74 and carried by a shaft 75. The notched rack member is held in engagement with the toothed periphery of said pinion by a guide 76 secured to said main frame. A drum 77 is secured to said shaft 75 and a cable 78 is spooled about said drum and carries a counter-weight 79 at its end. Said counter-weight is of such mass, is so arranged and the cable is so spooled as to tend to rotate the pinion counter-clockwise, as viewed in Fig. 11, and to move the swing frame outwardly. As can be noted in Fig. 11, the rack member 72 is not provided with teeth along its entire length and thus said rack member can be extended laterally only to a limited degree, that is, until the unnotched portion of said member strikes the toothed portion of the pinion.

The saw frame 66 is supported by a pair of divergent connecting rods 80 which are secured at their lower ends to the lowermost corners of said saw frame, as is illustrated in Fig. 12. Two divergent connecting rods are provided for supporting said saw frame so as to eliminate the tendency for said saw frame to be shifted laterally when only one side is operating upon a log. That is, if the saws at one side of the saw frame are operating and the ones at the other are not, or if the ones at one side are cutting more deeply than the other, or are encountering greater obstruction than the saws upon the other side, the saw frame would tend to be lifted at one corner. The divergent connecting rods 80 bearing diagonally toward the corners, however, tend to resist said lifting or turning of the saw frame.

At the upper end of said saw frames, they are joined to outstanding ears 82a of a crosshead 82. Said crosshead is arranged to slide between a pair of vertical uprights 62, which are of channel structure, as is shown in Fig. 14, and which engage the sides of said crosshead. Said crosshead has a lateral extension 82b which extends across and engages the upper face of the saw frame 66. Said crosshead also is provided with an outstanding ear 82c extending in the opposite direction. To said ear a vertical connecting rod 83 is secured. Said connecting rod 83 is engaged to a crank 84 in the main drive shaft 85. Said drive shaft is journaled in bearings 86 and is provided with a pulley 87 driven by an endless belt 88 which also engages the drive pulley 89 of the electric motor 90. Thus, when the electric motor rotates its drive pulley, it communicates motion to the pulley of said shaft and rotates the crank 84 therein. This tends to reciprocate the connecting rod 83 and therewith the crosshead 82. The reciprocation of the crosshead causes a corresponding reciprocation of the saw frame 66 acting thru the pair of divergent connecting rods 80. This causes the angularly arranged saw blades 69 to give a raking cut to the peripheral surface of the log 81 and to rake or ross the exterior of said log.

The saw blades not only move lengthwise thereof but are moved laterally as well because of the oblique angular arrangement of said blades. The blades are arranged so that a raking cut given by one saw blade will end at the point where the adjacent blade takes off. It is to be understood that the log in this modification is rotated as in the other, and the direction of rotation is indicated by the arrow in Fig. 11. Thus, as the log rotates and is subject to said series of raking actions, an operating swath is formed by said bank of saw blades which removes a continuous section of the peripheral surface of the log corresponding to the width of the bank of saw blades, as in the previous modification.

In Fig. 15 I illustrate how a removable tooth structure can be arranged in reciprocating saws as well as in rotary saws. In the structure illustrated in Figs. 15 and 16, the saws are arranged in encircling boxes 91 secured between fastening flanges 92. Said flanges are secured to the bounding members of a saw frame 93. A plurality of saw teeth 94 similar to the saw teeth in the modification shown in Figs. 6 to 10, inclusive, are arranged in said box in a grooved structure which constitutes a holder for said teeth and spacers 95. Said teeth and spacers are arranged within said body in said grooves and are held in place in a transverse member 96 wedged into said box. A tie bolt 97 extends laterally across the box and underlies the member 96 and holds it tightly so that a rigid structure is secured.

Altho my invention is primarily designed for the removing of bark and other uneven surfaces upon the periphery of a log, pole, piling, spar, buoy and the like, it is also adapted for cutting grooves or otherwise raking or hewing or evening up said peripheral surface of any of said structures. Inasmuch as the log or spar being operated upon is rotated when it is acted upon by my rossing machine, said machine can be used for roughly rounding up said members or forming circular recesses therein. A log or spar operated upon by my machine can be given a relatively smooth exterior surface comparable to the cut surface of a board because the saw structures and the teeth therein are relatively alined to give a smooth surface to the member being operated upon. In veneer logs and in paper making it is desirable to remove a minimum amount of bark and surface, and in this case my machine can be operated to follow the general contour of the log's surface to provide maximum material for veneer or for paper pulp.

I claim:

In a log rossing machine, a frame, a plurality of cutter elements mounted thereon and arranged in an operating bank, said cutter elements being closely spaced in said bank, means for driving said cutter elements at a relatively high speed along alined operating paths, said elements in the aggregate being operatively arranged to produce a substantially continuous cutting swath comparable in width to the length of said bank of cutter elements, means for feeding said bank of elements toward and from the log to be operated upon, yielding devices in said feeding means adapted to yield in the presence of an obstructing force of predetermined value, and means operatively connected with said driving means for rapidly oscillating said bank of cutter elements along a path laterally disposed to the cutting path of each cutting element.

CLINTON C. ERICKSON.